(12) United States Patent
Selman

(10) Patent No.: US 8,323,713 B1
(45) Date of Patent: Dec. 4, 2012

(54) HOME CARBONATION METHOD

(75) Inventor: Corey Miles Selman, West Hills, CA (US)

(73) Assignee: Corey M. Selman, West Hills, CA (US)

( * ) Notice: Subject to any disclaimer, the term of this patent is extended or adjusted under 35 U.S.C. 154(b) by 356 days.

(21) Appl. No.: 12/505,497

(22) Filed: Jul. 19, 2009

(51) Int. Cl.
*A23L 2/00* (2006.01)

(52) U.S. Cl. ........................................ 426/477; 426/118

(58) Field of Classification Search ................ 426/477, 426/118
See application file for complete search history.

(56) References Cited

U.S. PATENT DOCUMENTS

| | | | |
|---|---|---|---|
| 4,423,670 A | 1/1984 | Tenison | |
| 4,676,283 A * | 6/1987 | Caldwell | 141/4 |
| 4,792,454 A * | 12/1988 | Lemonnier | 426/8 |
| 4,823,969 A | 4/1989 | Caldwell | |
| 4,940,212 A | 7/1990 | Burton | |
| 4,999,140 A * | 3/1991 | Sutherland et al. | 261/59 |
| 5,366,745 A | 11/1994 | Daden | |
| 5,396,934 A | 3/1995 | Moench | |
| 5,489,399 A * | 2/1996 | Koyakumaru et al. | 252/373 |
| 5,505,345 A | 4/1996 | Zeid | |
| 5,531,254 A * | 7/1996 | Rosenbach | 141/113 |
| 6,079,458 A * | 6/2000 | Sten | 141/14 |
| 6,742,772 B2 * | 6/2004 | Kiefer | 261/65 |
| 7,296,508 B2 | 11/2007 | Hillyer | |

* cited by examiner

*Primary Examiner* — Anthony Weier

(57) ABSTRACT

An apparatus to make home carbonated aqueous solutions using commercial low cost screw capped disposable pressurizable beverage containers. The apparatus including screw capped bottles with barbed fittings and flexible tubing and a manifold connection to connect the reservoir bottles with the reactor bottle and the receiver bottle. Valves or pinch clamps, tubing connectors and a pressure relief valve are used. Yeast and a fermentable carbohydrate and water are mixed together in one disposable reactor bottle. The carbon dioxide emanating from the disposable reactor bottle is fed into two or more disposable reservoir bottles such that the carbon dioxide is separated from the yeast, sugar, water, and fermentation alcohols. A pressure relief valve is placed on tubing whose internal pressure is derived from the reactor bottle to prevent unsafe pressures from occurring within in the system. A pressure indicator shows when the system is properly pressurized. A chilled water-containing solution in a disposable receiver bottle to which flavors may be added is connected to the reservoir bottle(s) when the proper pressure has been achieved. The receiver bottle has adequate gas head space to allow the bottle contents to be shaken, hastening the dissolving of the carbon dioxide into the water.

8 Claims, 10 Drawing Sheets

US 8,323,713 B1

HOME CARBONATION METHOD

TECHNICAL FIELD

This invention relates to an apparatus and method of carbonating aqueous solutions.

BACKGROUND

Commercial soft drinks typically contain from 3.5 to 4 volumes of carbon dioxide at approximately 60 degrees Fahrenheit. For two liters of soda this comes to 14 to 16 grams of carbon dioxide. Seltzer may contain up to 5 volumes of gas. In one volume of water, one volume of carbon dioxide is soluble at 60 degrees Fahrenheit at one atmospheric pressure. Increasing amounts of carbon dioxide can be dissolved as temperature decreases and/or as pressure increases. For example, at 32 degrees Fahrenheit and 20 pounds per square inch gauge (psig), 4 volumes of carbon dioxide can be added to one volume of water.

Fermentation of carbohydrates is a natural process. Yeast and water are added to a fermentable carbohydrate. The resulting mixture is changed by the biological action of the yeast on the carbohydrate, forming alcohols and carbon dioxide as the primary byproducts. Grapes on vines may often have yeast that collects on the grape skin; when the grape is crushed to make grape juice, the yeast can react with the sugars in grape juice to form wine and carbon dioxide.

In the past, soft drinks were made by adding yeast to flavored sugar water, sealing the solution in a glass bottle, and leaving it to ferment. This technique resulted in the potential for dangerously high pressures, sometimes causing the bottle to explode. In addition, the fermentation byproducts and the yeast flavor resulted in an off taste.

Modern carbonation devices work well for large-scale production. There has not been a low-cost, easy-to-carbonate method using natural yeast fermentation, suitable for home use that utilizes disposable bottles as the carbon dioxide generating container which also holds the generated carbon dioxide in disposable reservoir bottle(s), and which uses reservoir bottles containing pressurized carbon dioxide for carbonating into a disposable receiver bottle.

U.S. Pat. No. 4,923,969 discloses a carbonation cap that has an integral check valve without a barbed fitting connection. It has no provision for a tube to be mounted inside the container for siphoning. U.S. Pat. No. 4,940,212 discloses a custom bottle and cap assembly with an integral spring-loaded check valve in the cap being charged by a conventional high pressure carbon dioxide tank. U.S. Pat. No. 5,366,745 discloses a chemical carbon dioxide generator but does not specify how pressure is maintained in the single disposable receiver bottle that takes 12 hours for some level of carbonation to occur. U.S. Pat. No. 7,296,508 discloses a reactor bottle consisting of a test tube containing a reactive chemical connected to a receiver bottle. The test tube must be tilted in order for its contents to mix with the contents of the bottle after the flanged connections to the cap are sealed. U.S. Pat. No. 5,396,934 teaches the unnecessary step of removing air from the receiver bottle, before adding carbon dioxide from a high pressure tank, which requires a step down pressure regulator. U.S. Pat. No. 5,505,345 is a carbonation dispensing cap with an integral valve which has no provision for adding carbon dioxide to a soda bottle. U.S. Pat. No. 4,423,670 discloses a single apparatus in which the alcohol is not separated from the receiver mixture and in which there is no pressure relief valve to set an exact carbonation level.

The prior art for home generated carbon dioxide does not store carbon dioxide whether by fermentation or by chemical means, nor does it have the separation of the reactor bottle yeast, alcohols, and water in a separate two volumes or more reservoir before adding it quickly to a ready single volume receiver bottle.

SUMMARY OF THE INVENTION

The present invention for home carbonation involves generating carbon dioxide from yeast to fill empty reservoir bottles such that the ratio of reservoir bottles is approximately two to five times or more the volume of chilled water to carbonate to approximately four volumes of carbon dioxide.

Using simple equipment and disposable bottles, one can carbonate a chilled water-based solution that may contain suspended solids within one minute with vigorous shaking once the proper pressure has been obtained. When thin walled disposable plastic bottles are used, one can estimate if there is sufficient pressure by squeezing the bottle. The fermentation mixture keeps fermenting for several days, allowing approximately four bottles to be filled once the proper pressure has reestablished itself in the reservoir bottles.

Additionally, carbon dioxide can also be generated by the action of a water based acid on a carbonate or bicarbonate salt.

The invention is ecologically friendly as disposable bottles can be reused, thereby minimizing harmful effects to the environment.

For reasons of economy, all connectors mate with flexible tubing using a hollow barbed connector. The bottle sizes can vary but all must be pressurizable.

DETAILED DESCRIPTION OF THE INVENTION

Figure 2:
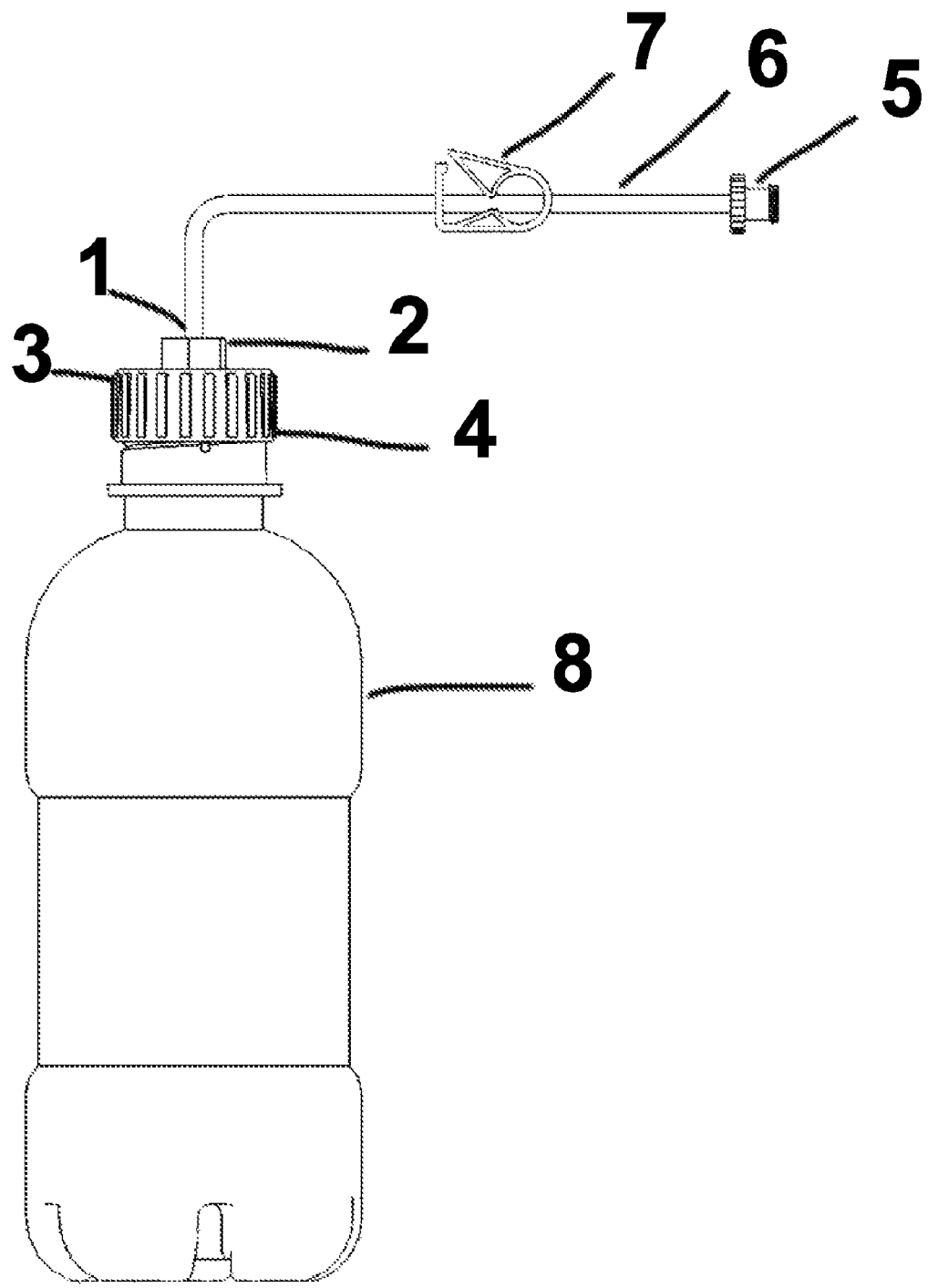
FIG. 2 is a side view of a receiver bottle assembly containing cap assembly FIG. 1, female luer 5, tubing 6, pinch clamp 7, and bottle 8.
Figure 6:
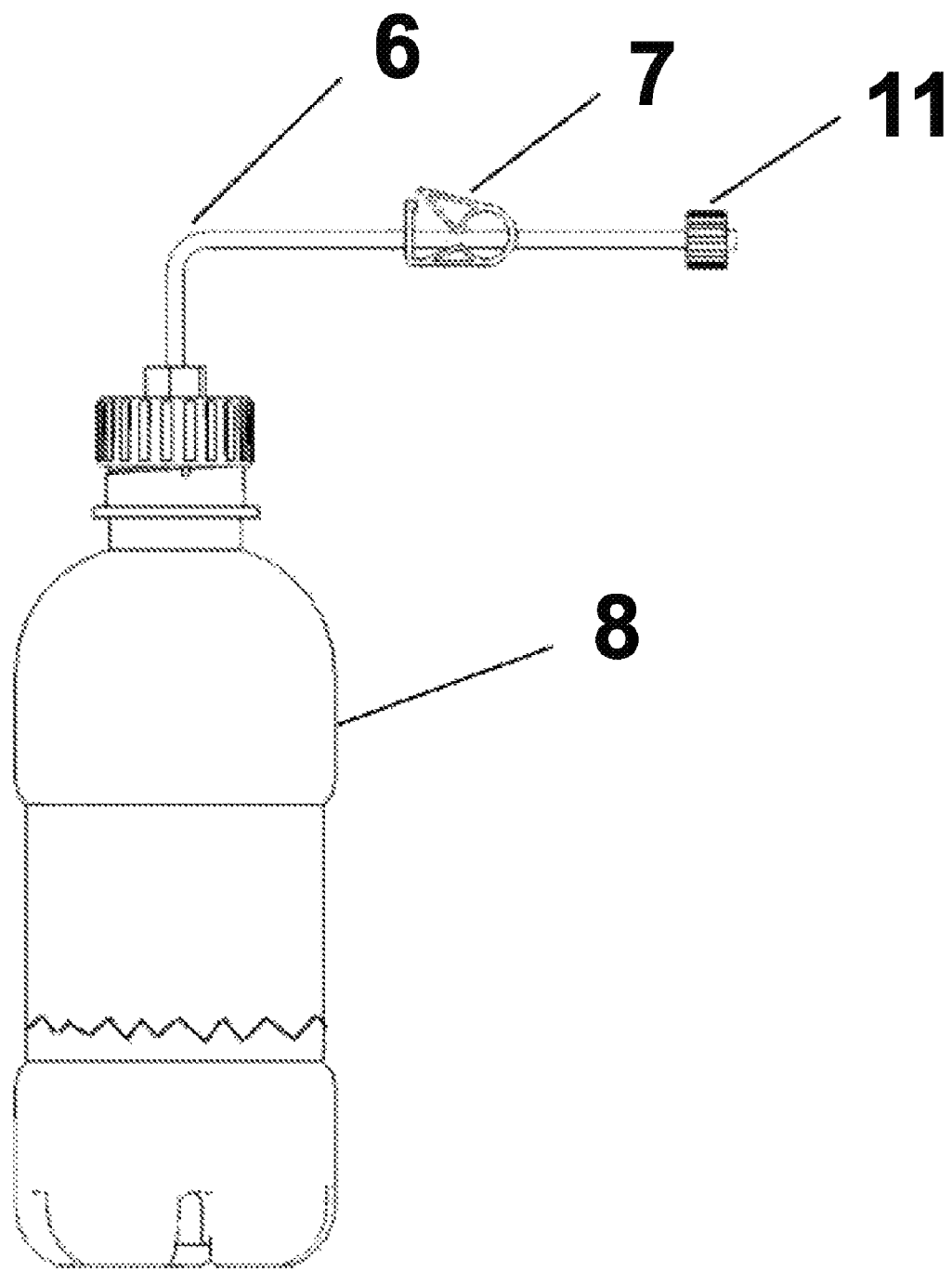
FIG. 6 is a side view of a reactor assembly containing FIG. 1 cap assembly, tubing 6, pinch clamp 7, bottle 8, male luer 11, one third filled with yeast, sugar, and water.
Figure 7:
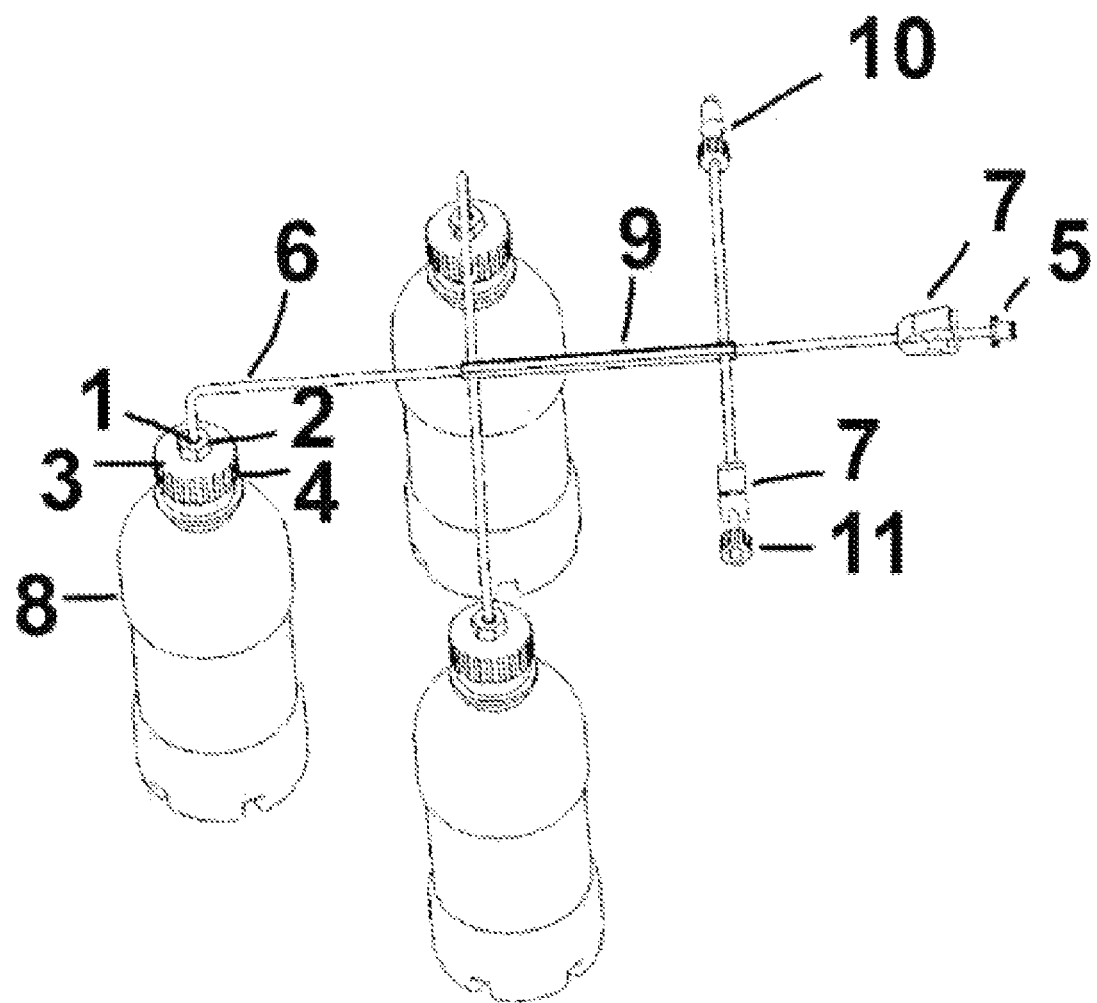
FIG. 7 is a perspective view of three connected bottles 16 which are composed of cap assembly FIG. 1, tubing 6, pinch clamp 7 and bottle 8, manifold 9, relief valve 10, and male luer 11.
Figure 8:
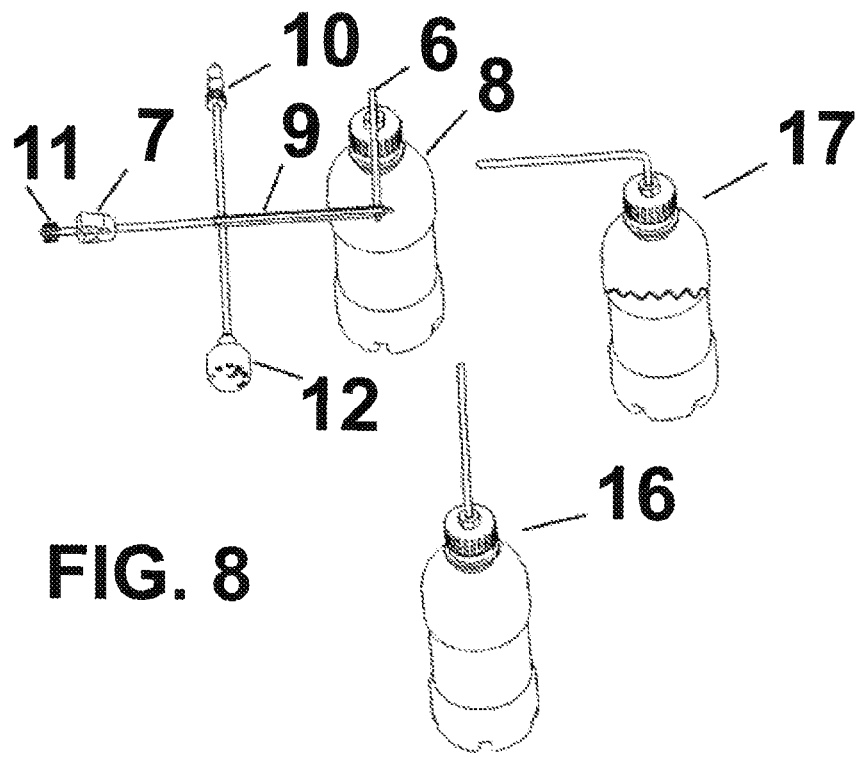
FIG. 8 is a partially exploded view of a three bottle assembly containing two reservoir assembly 16, reactor assembly 17 each containing cap assembly FIG. 1, tubing 6, and bottle 8, manifold 9, relief valve 10, male luer 11, pressure indicator 12; the reactor assembly 17 contains water, sugar and yeast.
Figure 9:
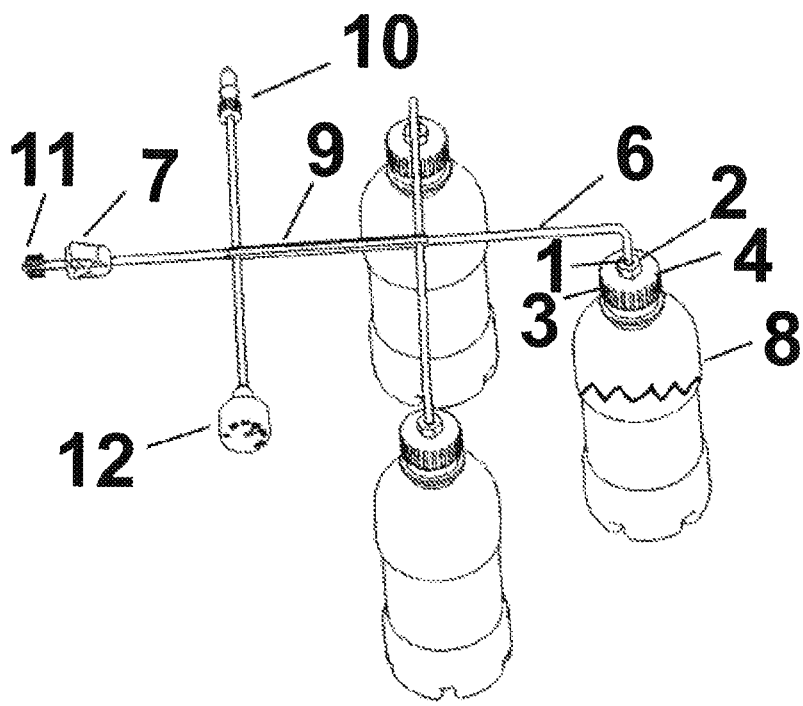
FIG. 9 is the unexploded view of FIG. 8.
Figure 10:
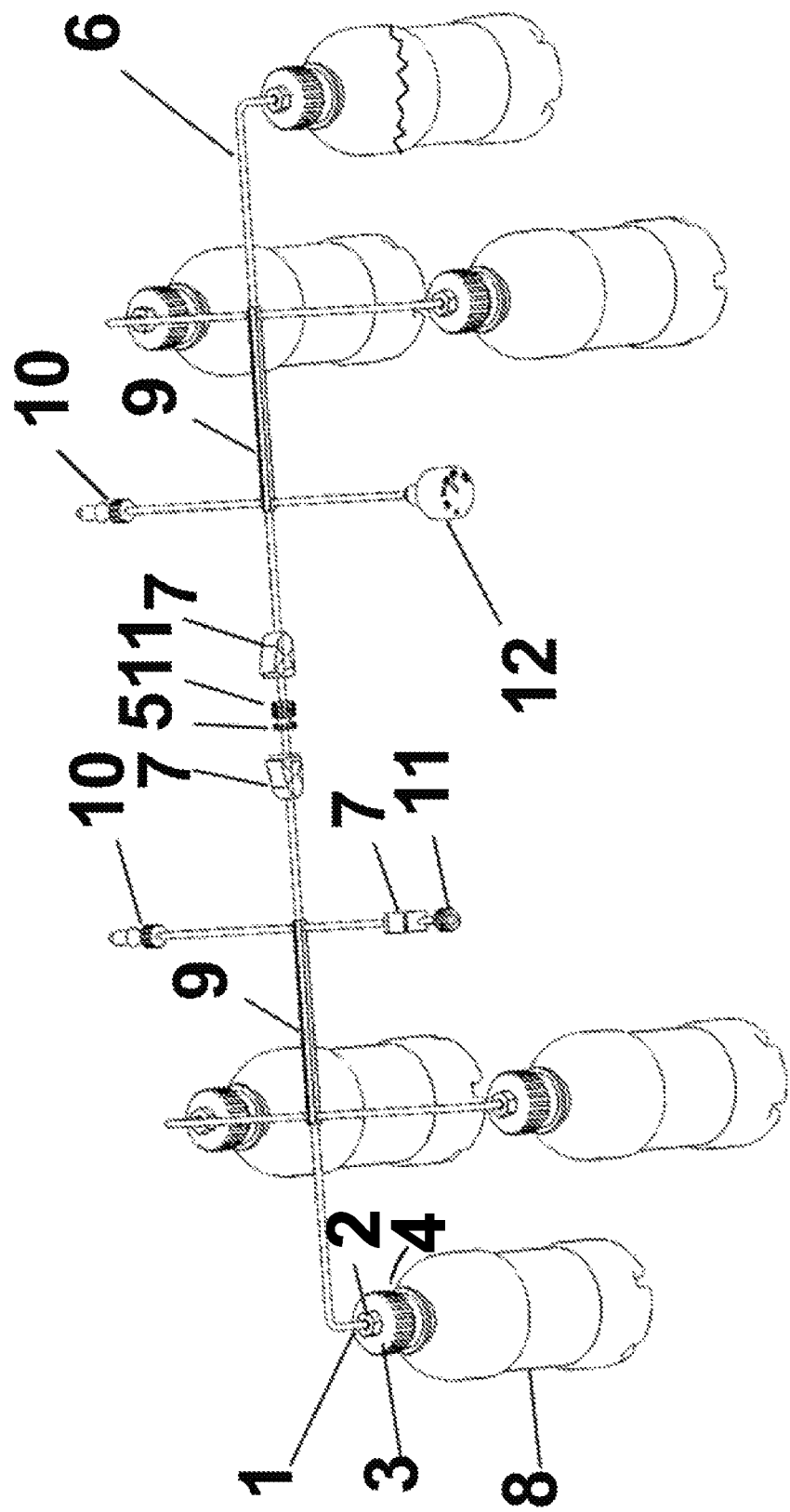
FIG. 10 is a perspective view of a six bottle assembly comprised of FIG. 7 and FIG. 9.
Figure 11:
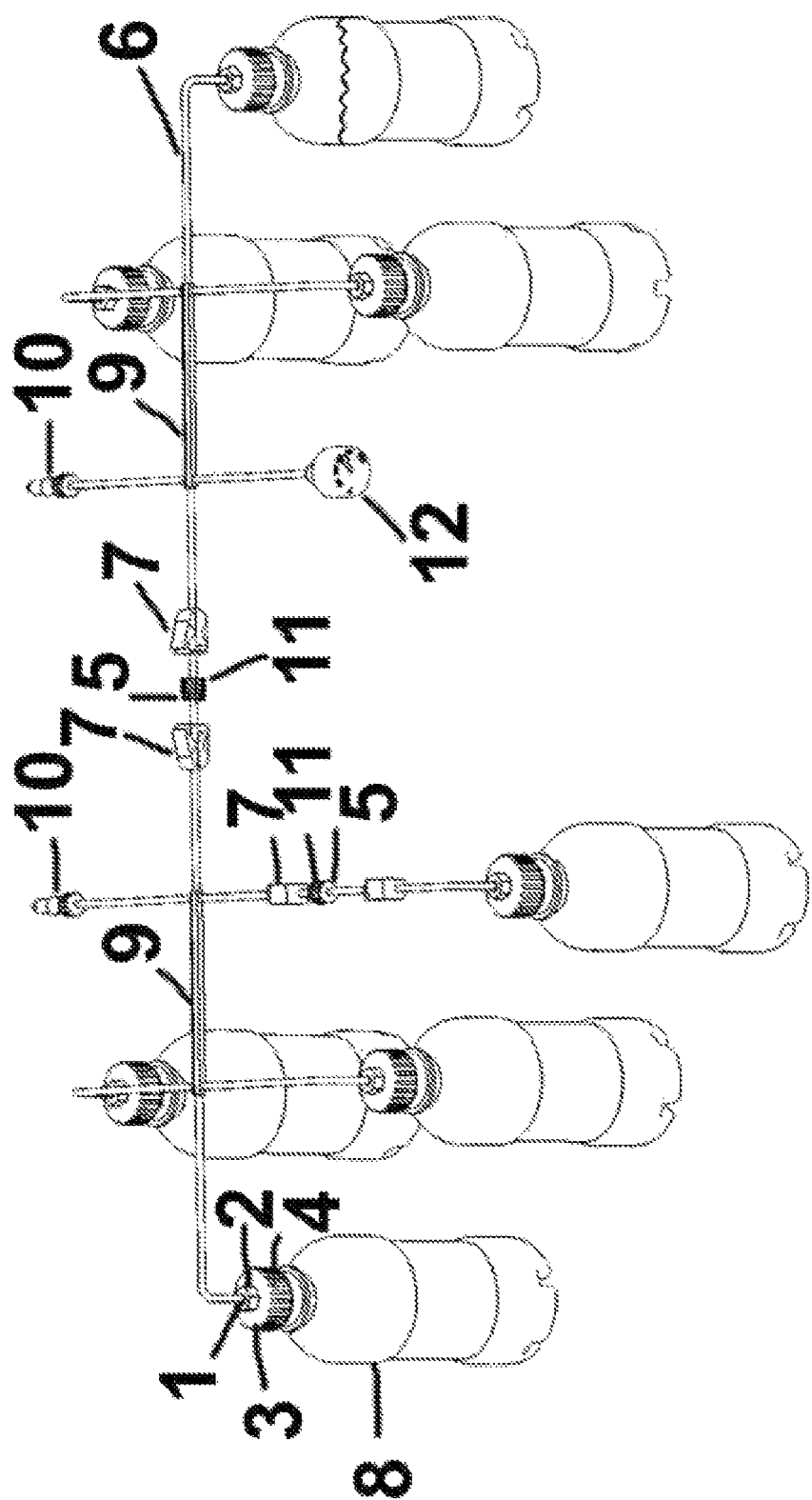
FIG. 11 is a perspective view of an embodiment of the present invention composed of FIG. 10 and FIG. 2.

FIG. 2 and FIG. 6 are physically identical excepting the choice of luer connector. FIG. 6 becomes a reactor assembly with the addition of water, sugar and yeast. Reservoir and Reactor bottles described herein are interchangeable, an empty reactor becomes a reservoir, and conversely a reservoir containing water, sugar and yeast becomes a reactor. FIG. 7 shows an arrangement of bottles which can be either reactor or reservoir. FIG. 8 shows a partially exploded assembly of two reservoir bottles 16 with one reactor bottle 17. FIG. 9 is the unexploded FIG. 8 assembly. This can attach to a chilled water containing FIG. 2 receiver bottle to carbonate. FIG. 10 is composed of FIG. 7 and FIG. 9. FIG. 11 is composed of FIG. 10 and FIG. 2. It contains a FIG. 2 receiver assembly connected to the other six bottles. Tables 1-1 and 1-2 shows in detail the benefits of having more than one reactor bottle in combination. A reactor mixture may comprise approximately 75% to approximately 95% of water by weight, approximately 5% to approximately 25% of sugar by weight, and approximately 0.01% to approximately 1% of yeast by weight. A typical reactor mixture, for example for a 2-liter bottle, may contain a cup of sugar and ¼ oz packet of commercial bread yeast, add 1.75 liters of water (or a solution comprised of 88.2% water, 11.4% sugar, and 0.4% yeast). Optimally, at least three inches of air space is left above the reactor mixture to allow the mixture to be shaken for a few seconds to mix ingredients. A fermenting yeast mixture will foam, which can partially fill the reservoir assembly bottles 16 if the reactor bottle assembly 17 is filled to the top.

Under ideal conditions in dilute solutions, approximately forty six percent of the weight of sucrose can be generated as carbon dioxide; the other approximately 54% gets converted into alcohol. A cup of sugar weighs ½ lb (227 gm). This will generate 104 grams of carbon dioxide, and 123 grams of alcohol. To pressurize five 2-liter reservoir bottles 16 to 30 psig or more, a two liter reactor bottle assembly 17 will generate approximately 50 grams of carbon dioxide. This is enough stored carbon dioxide to carbonate a 2-liter receiver bottle FIG. 2 containing chilled water. There is approximately another 54 grams of carbon dioxide that can be generated, available to re-pressurize the reservoir assembly bottles 16 as they are depleted while charging receiver bottles FIG. 2. Thus a total of four 2-liter receiver bottles FIG. 2 that can be filled with carbon dioxide. Pressure can be monitored using a pressure indicator 12 attached to the tubing 6 operatively connecting the bottles 8 or the bottles 8 themselves. Multiple reservoir bottle assemblies 16 and reactor bottle assemblies 17 may be interconnected using manifold 9. Female luers 10 or Male luers 11 or valves 7 may be used to interconnect tubing 6 so that gas or fluid flow can be started or stopped.

Commercial bread yeast stops converting sugar to alcohol at approximately 6% alcohol. 123 grams alcohol per 2000 grams mixture is 6%. Using a 2-liter bottle as the reactor bottle 17 one cup of sugar is the maximum amount of fuel that can be converted using ordinary baking yeast. After one to five days, all the sugar will be consumed and it will be possible to close pinch clamps 7, or a reversible tube closing device, empty the spent reactor mixture, and refill the reactor bottle 17 with fresh yeast, water and sugar in order to restart the process. As the reservoir bottles 16 will already be pressurized more of the carbon dioxide is available and up to five 2-liter bottles FIG. 2 can be filled.

Wine yeasts can convert sugar in alcohol concentrations up to 10-20%, depending on the variety and the growing medium. Therefore, more than a cup of sugar can be added to the starting mixture, which in turn can generate more carbon dioxide. Using the preferred arrangement as shown in FIG. 10 one could use up to four of the six reactor-reservoir bottles as reactor bottles 17 to quadruple the carbon dioxide generating capacity.

Carbonated soft drink bottles are offered in many volume sizes. For purpose of illustrating the following example let us assume that FIG. 6 is a six liter bottle. To carbonate a chilled 2-liter receiver bottle FIG. 2, using FIG. 6 which contains a cup of sugar, a ¼ oz packet of yeast, 1.75 liters of water and 4 liters of gas space an initial pressure of 45 psi or greater is needed (Table 1-1). The system pressure will drop 25 psi upon completion. Using only four liters of carbon dioxide storage, only one or two 2-liter receiver bottle assemblies FIG. 2 can be carbonated at a time. Table 1-1 the first entry shows the equivalence of using one 2-liter reactor bottle and two 2-liter reservoir bottles. This is the same as using one 6 liter reactor bottle filled with 2-liters of fermenting liquid. For safety purposes keeping the system pressure below 80 psig is wise. Pressure relieving valves 10 may be installed on the tubing 6 to control the pressure build up. Using the preferred embodiment of five volumes of reservoir to one volume of receiver will result in a 10 psi system drop for each carbonated receiver bottle. Starting with an initial system pressure of 75 psig, a total of five 2-liter receiver bottles FIG. 2, may be carbonated in a ten minute period.

The screw caps 4 most in use for carbonated beverages are the 28 mm and 38 mm caps. The 28 mm cap is used on 10 oz, 12 oz, ½ liter, 20 oz, 24 oz, 1 liter, 1.5 liter, 2 liter and 2.5 liter bottles. This is by far the most common carbonation cap available for screw cap bottles. The new short height Beri 28 mm cap used on custom ½ liter and smaller bottles will not fit bottles that are made for the regular 28 mm cap. The cap size is known as the finish. There are industry recognized carbonated soft drink caps drawing numbers Alcoa 1716, Alcoa 1788, BPF-C, PCO-1810, PCO-1815, PCO-1816, PCO-1817, PCO-1820, PCO-1823. Preferably, the cap 4 has a thread capability to fit commonly used bottle threads 1716 and PCO for PET bottles and 1655 for glass bottles. The 38 mm carbonated soft drink cap Alcoa 1690 is less commonly used on the 1 liter, 3 liter and 6 liter bottles.

Figure 1:
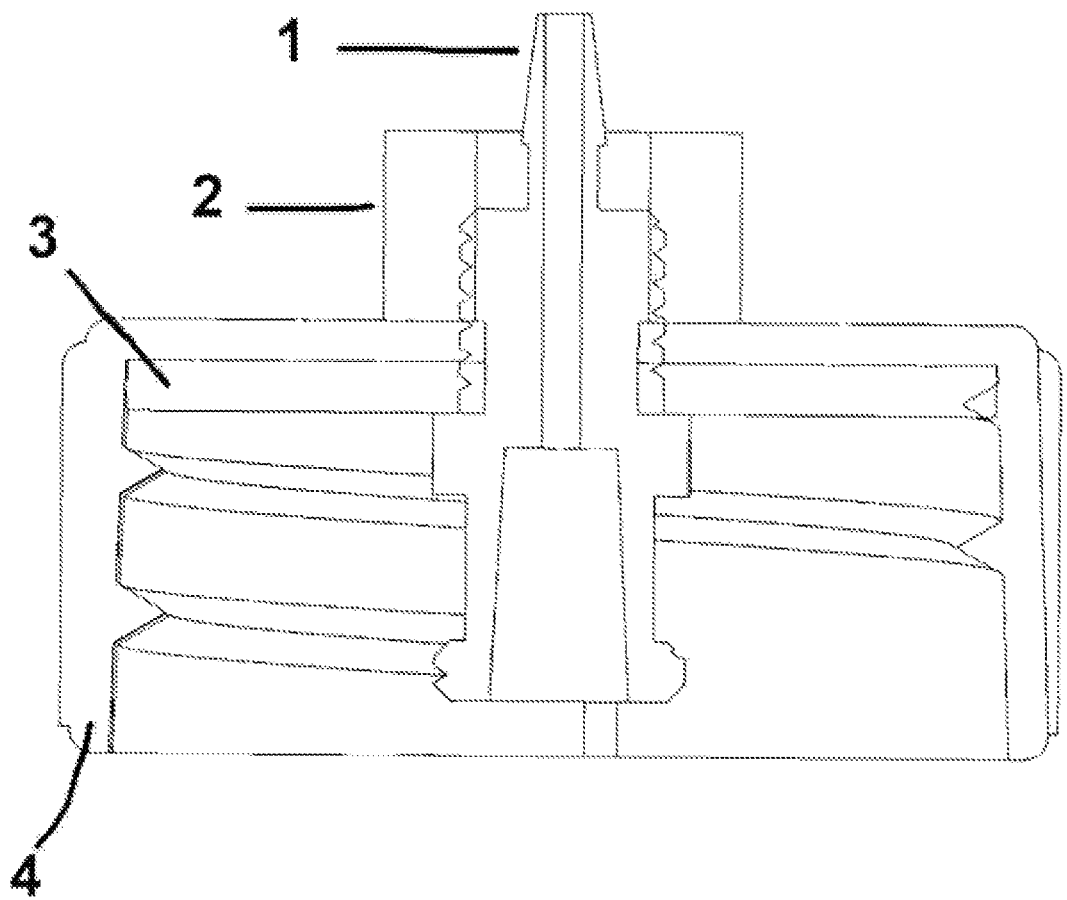
FIG. 1 is a cross-section view of a cap assembly containing barbed bulkhead fitting 1, nut 2, gasket 2 and cap 4.

Caps for carbonated beverages are made in one piece and two piece versions. One piece closures have an integral sealing ring that seals both inside as well as outside of the bottle opening. Two piece closures have a soft plastic gasket which seals at the top of the bottle. Preferably the soft gasket is bonded to the hard shell of the cap. FIG. 1 shows a barbed bulkhead fitting 1. It is held in compression against the gasket 3 with an externally threaded nut 2 on the top of the cap 4. An integrally molded hollow through the cap barb fitting 1 that fits on a screw cap 4 is preferred. The screw cap threads are discontinuous to prevent hazardous cap ejection when unscrewing the bottle 8, as the pressurized gas is relieved before the cap 4 is fully unscrewed.

FIG. 11 shows the preferred five to one ratio of reservoir assembly 16 to receiver bottles FIG. 2. Five connected together 2-liter reservoir bottle assemblies 16 can fully carbonate one 2-liter chilled receiver bottle assembly FIG. 2, or six 12 oz receiver bottles once the 30 psig range has been reached. The pressure of the reservoir bottle assemblies 16 will change from approximately 30 psig to 20 psig upon fully carbonating a 2-liter chilled water bottle. The second entry in Table 1-1 illustrates this. The manifold 9 connected reservoir bottle assemblies 16 and the reactor bottle assembly 17 can reach 30 psig again if fermentation is still occurring in the reactor. In addition, the system can operate at higher pressures; for example, at 66 psig a 70 degree Fahrenheit 2-L receiver bottle assembly FIG. 2 containing water can be carbonated to four volumes of carbon dioxide.

Typically in FIG. 11 the five reservoir bottle assemblies 16 will re-pressurize in a few hours allowing the re-carbonation of another 2-liter receiver bottle assembly FIG. 2, the combination is shown in FIG. 11. At 30 psi or above there is enough stored gas to carbonate up to six 12 oz chilled water-containing receiver bottles if using five 2-liter pressurized reservoir containers. Using smaller or larger bottles will work according to the same ratios.

Figure 3:
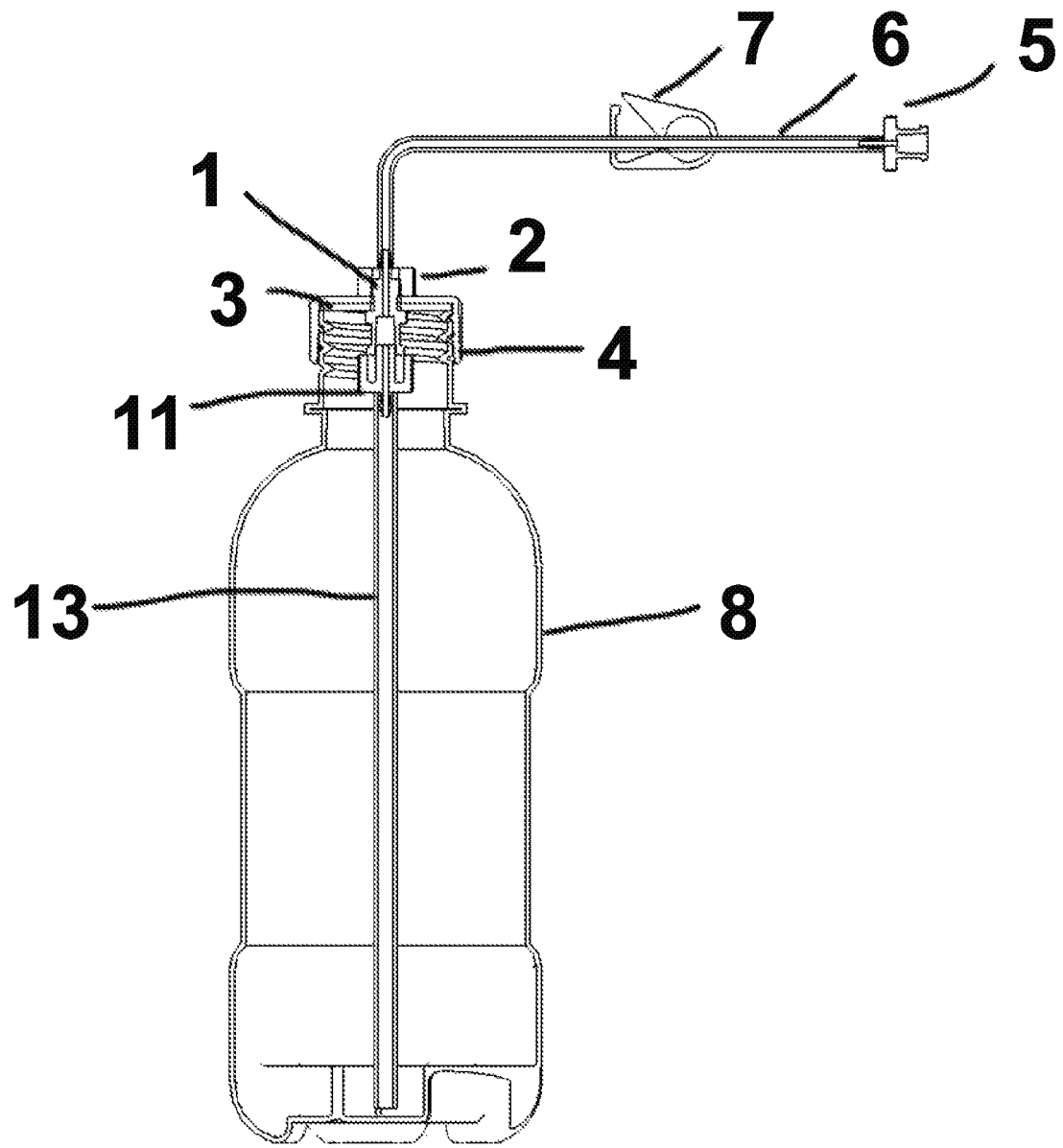
FIG. 3 is a cross-section view of the receiver bottle assembly shown in FIG. 2 with the addition of male luer 11, siphon tube 13.
Figure 4:
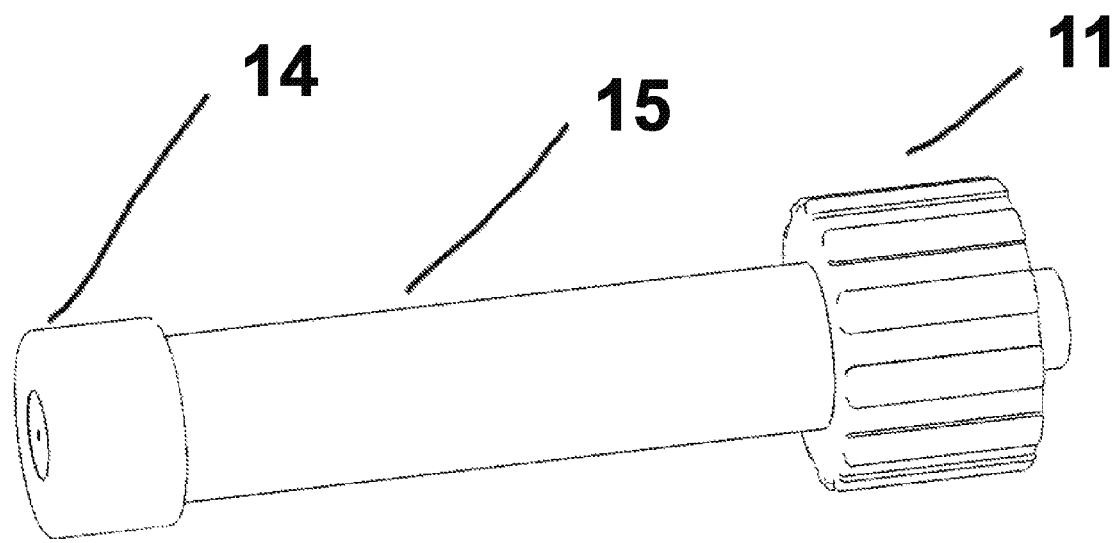
FIG. 4 is an assembly of a male luer 11, misting nozzle 14, and tubing 15.
Figure 5:
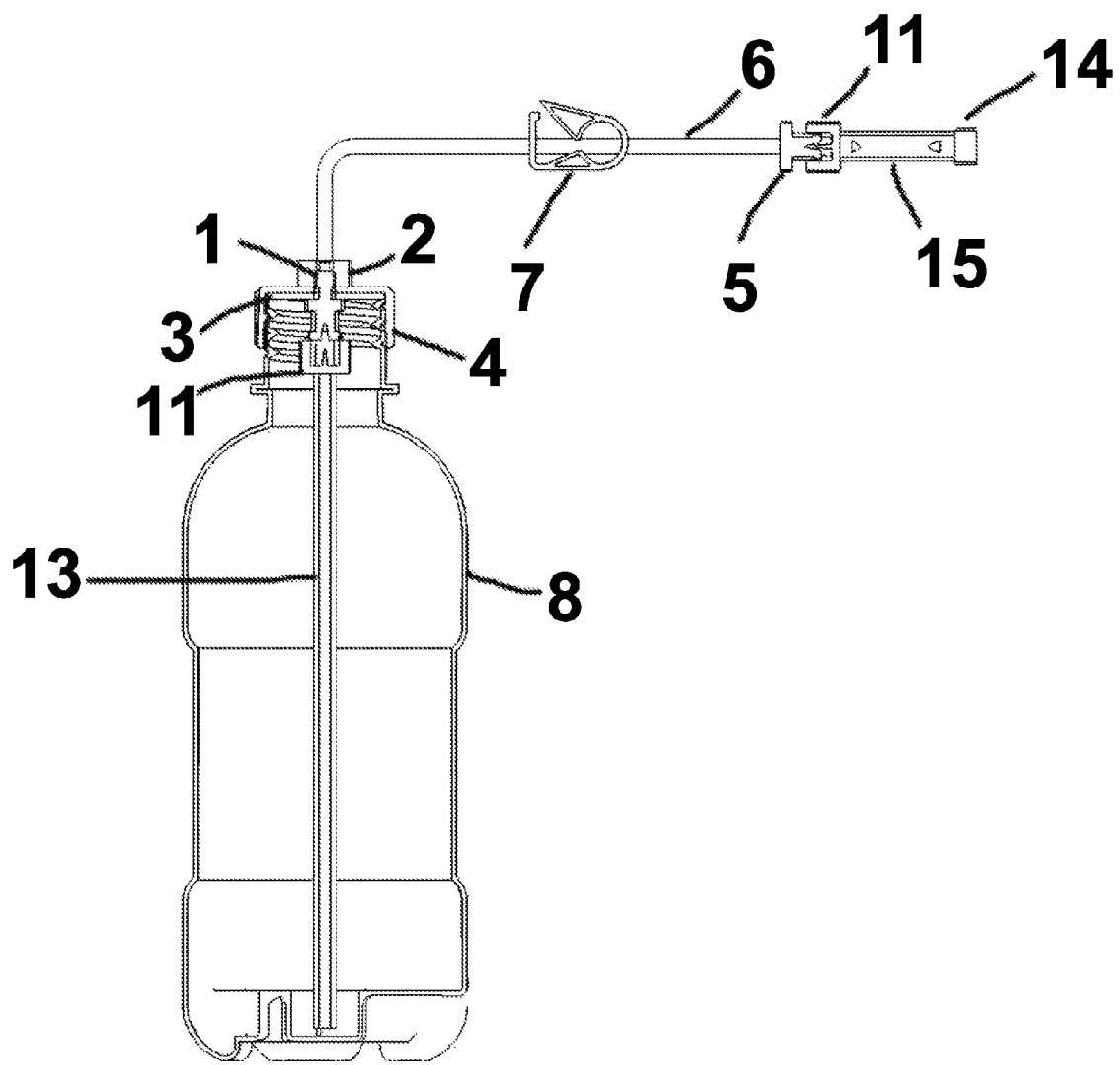
FIG. 5 is a cross-section view of a misting sprayer assembly, which is a combination of FIG. 3 and FIG. 4

FIG. 5 shows a cross sectional view of misting device composed of FIG. 3 and FIG. 4 assemblies. The optimal hole size for the misting nozzle 14 is up to 1/50 inch in diameter; furthermore, this misting nozzle 14 may have internal baffling to break up the flow into smaller streams. When a receiver bottle assembly FIG. 3, is pressurized with carbon dioxide gas in water, the carbonated water can spray out in a mist without any manual pumping needed by attaching a misting assembly FIG. 4. The misting can be stopped and restarted as needed with a tubing pinch clamp or valve 7. A larger hole up to 1/16 inch in diameter without internal baffling can act as a squirt gun capable of projecting carbonated water out over a span of fifteen feet FIG. 3. Manifold 9 connected pressurized reservoir bottle assemblies 16 with luer connector and valve 7 can be used to fill up other inflatable devices, such as an inflatable pool toy or inflatable boat or tire, instead of filling a water filled receiver bottle assembly FIG. 2.

TABLE 1-1

| 2-liter Bottle Configurations Each reactor bottle filled with 1cup sugar, 1.75 L water 1 standard packet yeast | Minimum Starting Pressure to fill 2-liter bottle | Minimum Ending Pressure to fill 2-liter bottle | Pressure Drop | Number of 2-liter Receiver bottles that can be rapidly filled starting at 75 psi |
|---|---|---|---|---|
| (1 reactor bottle) 2 reservoir bottle | 45 psi | 20 psi | 25 psi | 2 |
| (1 reactor bottle) 5 reservoir bottles | 30 psi | 20 psi | 10 psi | 5 |
| (2 reactor bottles) 4 reservoir bottles | 33 psi | 20 psi | 13 psi | 4 |
| (3 reactor bottles) 3 reservoir bottles | 37 psi | 20 psi | 17 psi | 3 |
| (4 reactor bottles) 2 reservoir bottles | 45 psi | 20 psi | 25 psi | 2 |

When using one 2-L bottle as your fermentation vessel with one cup sugar and one tablespoon of baking yeast (standard packet) and filling with water leaving a 3 inch air space you should expect to see the pressure gauge read when using five 2-L bottles as a reservoir 10 psi increase each day (Table 1-2). Using two 2 L reactor bottles and four 2-L reservoir bottles generates 25 psi pressure after the first day (Table 1-2). The pressure relief valves will open above 75 psi and will reseal at a pressure above 40 psi. Most of the carbon dioxide generated will be wasted if one does not start to carbonate by day 2 for two or more reactor bottles. One could add less yeast to slow down the reaction if desired for multiple reactor bottles.

TABLE 1-2

| DAY | (one 2-L reactor bottle) five 2-L reservoir bottles pressure | (one 2-L reactor bottle) two 2-L reservoir Bottles pressure | (two 2-L reactor bottles) four 2-L reservoir bottles pressure | (three 2-L reactor bottles) three 2-L reservoir bottles pressure | (four 2-L reactor bottles) two 2-L reservoir bottles pressure |
|---|---|---|---|---|---|
| 1 | 10 psi | 25 psi | 25 psi | 50 psi | ≦75 psi |
| 2 | 20 psi | 50 psi | 50 psi | ≦75 psi | ≦75 psi |
| 3 | 30 psi | ≦75 psi | ≦75 psi | ≦75 psi | ≦75 psi |

TABLE 1-2-continued

| DAY | (one 2-L reactor bottle) five 2-L reservoir bottles pressure | (one 2-L reactor bottle) two 2-L reservoir Bottles pressure | (two 2-L reactor bottles) four 2-L reservoir bottles pressure | (three 2-L reactor bottles) three 2-L reservoir bottles pressure | (four 2-L reactor bottles) two 2-L reservoir bottles pressure |
|---|---|---|---|---|---|
| 4 | 40 psi | ≦75 psi | ≦75 psi | ≦75 psi | ≦75 psi |
| 5 | 50 psi | ≦75 psi | ≦75 psi | ≦75 psi | ≦75 psi |
| 6 | 60 psi | ≦75 psi | ≦75 psi | ≦75 psi | ≦75 psi |
| 7 | 70 psi | ≦75 psi | ≦75 psi | ≦75 psi | ≦75 psi |

Another alternative of the invention includes a method where the reservoir bottle is not used. In particular, carbon dioxide is still generated in the reactor bottle, again having the hollow through-the-cap fitting and containing the reactor mixture. However, the reactor bottle has 50% or more gas storage space above the reactor mixture, said space acting as the carbon dioxide pressure holding reservoir wherein said space is pressurized solely by the generation of carbon dioxide emanating from the reactor mixture in said reactor bottle. When the storage space above the reactor mixture is pressurized with carbon dioxide to 20 psig or greater, the carbon dioxide is then released to a receiver bottle having a second hollow through-the-cap fitting, said receiver bottle being subsequently shaken to carbonate the liquid contained therein.

What I claim is:

1. A method of carbonating a liquid in a pressurizable screw capped beverage bottle, comprising:
   a. generating carbon dioxide in a reactor bottle having a first hollow through-the-cap fitting;
   b. introducing the carbon dioxide to at least one reservoir bottle having a second hollow through-the-cap fitting, acting as a carbon dioxide pressure holding reservoir, said reservoir bottle being pressurized solely by the generation of carbon dioxide from the reactor bottle emanating into the reservoir bottle;
   c. transferring the carbon dioxide to a receiver bottle having a third hollow through-the-cap fitting, the receiver bottle comprising the liquid; and
   d. shaking the receiver bottle to carbonate the liquid.

2. The method of claim 1, wherein the carbon dioxide is transferred to the receiver bottle when sufficient pressure has accumulated in the reservoir bottle.

3. The method of claim 1, wherein the carbon dioxide is stored in the reservoir bottle prior to transferring to the receiver bottle.

4. The method of claim 1, wherein the receiver bottle has an internal air space of approximately at least 5% of the total volume of the receiver bottle.

5. The method of claim 1, wherein the total volume of the receiver bottle is at most one-half the volume of the reservoir bottle.

6. The method of claim 1, wherein the carbon dioxide is generated by mixing yeast, a fermentable carbohydrate, and water in the reaction bottle.

7. The method of claim 1, wherein the carbon dioxide is generated by mixing an acid with a carbonate containing compound.

8. A method of carbonating a liquid in a pressurizable screw capped beverage bottle comprising:
   (a) generating carbon dioxide in a reactor bottle, said reactor bottle containing a reactor mixture, wherein said reactor bottle also has a first hollow through-the-cap fitting and also 50% or more gas storage space above the reactor mixture, said gas storage space acting as a carbon dioxide pressure holding reservoir and said gas storage space being pressurized solely by the generation of carbon dioxide emanating from the reactor mixture to said gas storage space;

(b) when said gas storage space contains pressurized carbon dioxide of 20 psig or greater generated from the reactor mixture, said carbon dioxide is transferred to a receiver bottle having a second hollow through-the-cap fitting, the receiver bottle being said pressurizable screw capped beverage bottle containing said liquid; and (c) shaking the receiver bottle to carbonate the liquid contained therein.

* * * * *